(12) United States Patent
Fladoos

(10) Patent No.: US 11,774,159 B2
(45) Date of Patent: Oct. 3, 2023

(54) FLEXIBLE ADHESIVE TAPE FOR COOLING BEVERAGES, PIPES AND OTHER ARTICLES

(71) Applicant: Jason Fladoos, Santa Monica, CA (US)

(72) Inventor: Jason Fladoos, Santa Monica, CA (US)

( * ) Notice: Subject to any disclaimer, the term of this patent is extended or adjusted under 35 U.S.C. 154(b) by 0 days.

(21) Appl. No.: 16/418,980

(22) Filed: May 21, 2019

(65) Prior Publication Data

US 2020/0256608 A1    Aug. 13, 2020

Related U.S. Application Data

(63) Continuation-in-part of application No. 16/184,188, filed on Nov. 8, 2018, now Pat. No. 10,342,889, and
(Continued)

(51) Int. Cl.
| | |
|---|---|
| *F25D 5/02* | (2006.01) |
| *B32B 7/12* | (2006.01) |
| *B32B 7/027* | (2019.01) |
| *B32B 27/08* | (2006.01) |
| *C09K 5/18* | (2006.01) |

(Continued)

(52) U.S. Cl.
CPC ................ *F25D 5/02* (2013.01); *B32B 7/027* (2019.01); *B32B 7/12* (2013.01); *B32B 27/08* (2013.01); *C09J 7/29* (2018.01); *C09J 11/04* (2013.01); *C09J 11/06* (2013.01); *C09K 5/18* (2013.01); *B32B 2307/30* (2013.01);
(Continued)

(58) Field of Classification Search
CPC .................................... B32B 7/12; F25D 3/08
See application file for complete search history.

(56) References Cited

U.S. PATENT DOCUMENTS 3,175,558 A * 3/1965 Caillonette ............... A61F 7/03
607/114
3,299,890 A * 1/1967 Parker ............... A61F 13/00038
602/77
(Continued)

FOREIGN PATENT DOCUMENTS

CN    106982271 A  *  7/2017
EP    0 3345 126 A1    6/1989

OTHER PUBLICATIONS

Written Opinion of PCT International Searching Authority dated Oct. 5, 2020.

*Primary Examiner* — Kim M Lewis
(74) *Attorney, Agent, or Firm* — William J. Benman; Benman, Brown & Williams

(57) ABSTRACT

A cooling tape and cooling pad. In a most general embodiment, the inventive tape includes a first layer of thermally conductive material; a second layer of thermal insulation; and a third layer of endothermic material, sandwiched between the first and second layers. The third layer is constructed with reactants effective to cause an endothermic chemical reaction. In a first embodiment, the invention provides a beverage cooling device. In a second embodiment, the invention provides a pipe cooling/freezing device. The cooling pad is implemented with a first layer of thermally conductive material; a second layer of material; and a third layer of endothermic material, sandwiched between the first and second layers. In the illustrative embodiment, the third layer has a contour effective to create suction whereby the pad adheres to a surface to be cooled.

1 Claim, 4 Drawing Sheets

Related U.S. Application Data a continuation-in-part of application No. 16/120,651, filed on Sep. 4, 2018, now Pat. No. 10,350,109, and a continuation-in-part of application No. 16/022,569, filed on Jun. 28, 2018, now Pat. No. 10,492,957.

(51) Int. Cl.
  *C09J 11/04* (2006.01)
  *C09J 11/06* (2006.01)
  *C09J 7/29* (2018.01)

(52) U.S. Cl.
  CPC ....... *B32B 2405/00* (2013.01); *C09J 2400/10* (2013.01); *C09J 2400/20* (2013.01)

(56) References Cited

U.S. PATENT DOCUMENTS

| | | | | |
|---|---|---|---|---|
| 3,900,035 A | * | 8/1975 | Welch | A61F 7/10 607/108 |
| 3,940,905 A | * | 3/1976 | Perry | A61F 7/03 53/412 |
| 4,344,303 A | * | 8/1982 | Kelly, Jr. | B65D 81/3883 62/530 |
| 4,397,315 A | * | 8/1983 | Patel | A61F 7/03 607/114 |
| 4,932,333 A | * | 6/1990 | Jensen | A47B 3/14 248/688 |
| 4,989,418 A | * | 2/1991 | Hewlett | B65D 81/3883 62/372 |
| 5,005,374 A | * | 4/1991 | Spitler | A41D 13/0055 2/171.2 |
| 5,304,216 A | * | 4/1994 | Wallace | A61F 7/0241 607/108 |
| 5,395,399 A | * | 3/1995 | Rosenwald | A61F 5/0104 607/108 |
| 5,431,622 A | * | 7/1995 | Pyrozyk | A61F 13/0203 602/2 |
| 5,934,100 A | * | 8/1999 | Hornick | B65D 81/3883 62/371 |
| 6,036,004 A | | 3/2000 | Bowen | |
| 6,128,915 A | * | 10/2000 | Wagner | B65D 81/3883 62/457.3 |
| 6,427,678 B1 | * | 8/2002 | Trzeciak | A01K 87/085 126/204 |
| 6,666,836 B1 | * | 12/2003 | Islava | A61F 7/02 602/41 |
| 6,786,062 B1 | * | 9/2004 | Greenberg | F25D 3/08 62/457.4 |
| 7,089,757 B2 | * | 8/2006 | Yang | F25D 3/08 62/371 |
| 7,249,385 B2 | * | 7/2007 | Schukraft | A61F 13/105 2/21 |
| 7,264,602 B1 | * | 9/2007 | Longsworth | A61F 13/0203 602/2 |
| 7,588,548 B2 | * | 9/2009 | Kopreski | A61F 7/106 206/441 |
| 9,702,609 B2 | * | 7/2017 | Robb | F25D 3/08 |
| 2002/0042641 A1 | * | 4/2002 | Johnson | A61F 7/02 607/114 |
| 2002/0052569 A1 | * | 5/2002 | Horning | A61F 7/10 602/41 |
| 2003/0055366 A1 | * | 3/2003 | Chalek | A61F 7/02 602/2 |
| 2003/0109816 A1 | * | 6/2003 | Lachenbruch | A61F 13/0213 602/2 |
| 2005/0080368 A1 | * | 4/2005 | Hurwitz | A61F 13/0203 602/2 |
| 2008/0141683 A1 | * | 6/2008 | O'Connor | A61F 7/106 62/4 |
| 2010/0005828 A1 | * | 1/2010 | Fedell | F25D 3/08 62/457.4 |
| 2011/0034887 A1 | * | 2/2011 | Forden | A61F 7/10 604/291 |
| 2012/0095380 A1 | * | 4/2012 | Gergely | A61F 13/53717 602/45 |
| 2014/0054010 A1 | * | 2/2014 | Peters | F25D 31/002 165/104.11 |
| 2014/0166672 A1 | * | 6/2014 | Stroucken | A47G 23/0313 220/592.01 |
| 2015/0297396 A1 | * | 10/2015 | Whitely | A61F 7/106 607/114 |
| 2017/0105877 A1 | * | 4/2017 | Buteux | B65D 75/367 |

\* cited by examiner

FLEXIBLE ADHESIVE TAPE FOR COOLING BEVERAGES, PIPES AND OTHER ARTICLES

REFERENCE TO PRIOR APPLICATION

This application is a continuation-in-part of U.S. Patent application entitled FLEXIBLE ADHESIVE PHYSIO TAPE WITH COOLING PROPERTIES filed by J. Fladoos on Sep. 4, 2018, Ser. No. 16/120,651 the teachings of which are hereby incorporated herein by reference.

BACKGROUND OF THE INVENTION

Field of the Invention

The present invention relates to tapes and bindings. More specifically, the present invention relates to systems and methods for cooling beverages, pipes and other articles.

Description of the Related Art

Numerous methods and apparatus are known in the art for cooling containers, conduits and the fluids, gases and solids therein. For containers such as bottles and cans, refrigerators, ice boxes, freezer and the like are widely used. However, these devices are generally unable to sustain an optimal temperature of the fluids or gases after removal of the container and not available for pipes and conduits.

Cooling tape is known in the art but only as a heat sink, not as a structure capable of providing active cooling per se.

However, the parent application (U.S. patent application entitled FLEXIBLE ADHESIVE PHYSIO TAPE WITH COOLING PROPERTIES filed by J. Fladoos on Sep. 4, 2018, Ser. No. 16/120,651 the teachings of which are hereby incorporated herein by reference, teaches a cooling physio tape for cooling human tissue. While this patent mentions in passing that such a construction could be adapted for cooling beverage containers, a detailed teaching is not provided.

Hence, there is a need in the art for a simple, effective, fast acting, portable, low cost beverage cooling device.

SUMMARY OF THE INVENTION

The need in the art is addressed by the cooling tape and cooling pad of the present invention. In a most general embodiment, the inventive tape includes a first layer of thermally conductive material; a second layer of thermal insulation; and a third layer of endothermic material, sandwiched between the first and second layers. The third layer is constructed with reactants effective to cause an endothermic chemical reaction.

In a first embodiment, the invention provides a beverage cooling device. In a second embodiment, the invention provides a pipe cooling/freezing device. In a specific embodiment, a breakable barrier in the third layer separates the reactants so the cooling can be initiated at any point by breaking the barrier. The third layer could include multiple layers saturated or interwoven with reactants. The reactants are dry solid compounds such as ammonium nitrate, calcium ammonium nitrate, potassium chloride, ammonium chloride or urea. The tape is adapted for activation by breaking a barrier separating water filled chambers and chambers with one or more of the dry compounds, allowing them to mix to initiate the endothermic reaction. The reactants could be implemented with barium hydroxide octahydrate crystals and dry ammonium chloride or thionyl chloride ($SOCl_2$) and cobalt (II) sulfate heptahydrate or ethanoic acid and sodium carbonate.

The third layer could be implemented as a powder or crystal or implemented as a liquid in which case the third layer has sealed borders. The third layer can be implemented with segmented lengths of endothermic reactants to allow for the tape to be cut at various lengths without cutting through a layer of reactants.

The beverage cooling device can be implemented as a cooling pad with a first layer of thermally conductive material; a second layer of material which may or may not include material providing thermal insulation to prevent the freezing of the object that the cooling pad is set on; and a third layer of endothermic material, sandwiched between the first and second layers.

In the illustrative embodiment, at least one of the layers has a contour effective to create suction whereby the pad adheres to a surface to be cooled. This layer may also have adhesive to stick the surface of the object being cooled.

BRIEF DESCRIPTION OF THE DRAWINGS

FIG. 3b is a sectional end view of the tape depicted in FIG. 3a.

FIG. 3c is a sectional side view of the tape depicted in FIG. 3a.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
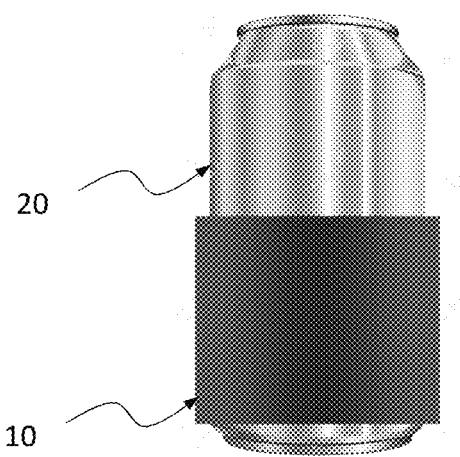
FIG. 1 is perspective view of the cooling tape of the present invention mounted on a beverage container in accordance with an illustrative embodiment of the invention.

FIG. 1 is perspective view of the cooling tape 10 of the present invention mounted on a beverage container 20 in accordance with an illustrative embodiment of the invention.

Figure 2:
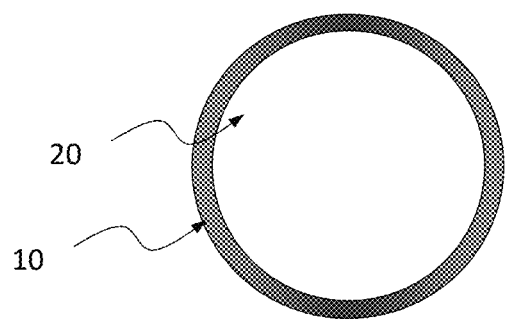
FIG. 2 is a top view of the cooling tape of FIG. 1.

FIG. 2 is a top view of the cooling tape 10 of FIG. 1 mounted on the beverage container 20.

Figure 3A:
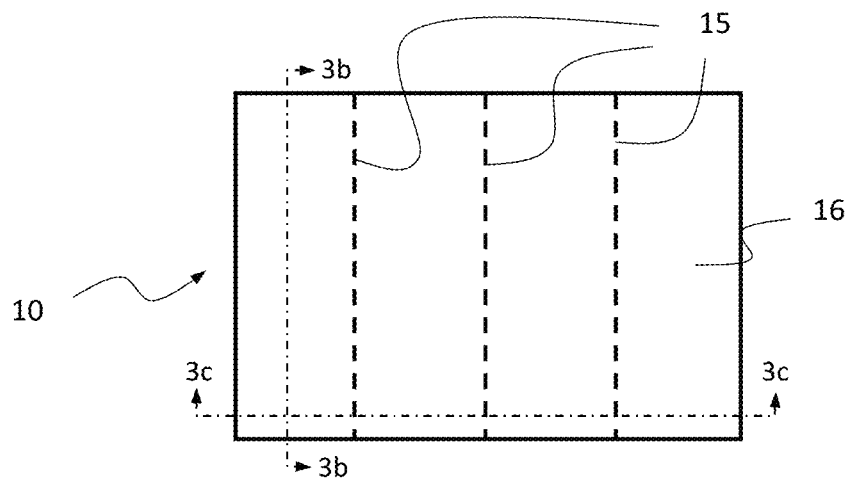
FIG. 3a is top schematic view of an illustrative embodiment of the cooling tape of the present invention.

FIG. 3a is top schematic view of an illustrative embodiment of the cooling tape 10 of the present invention.

Figure 3B:
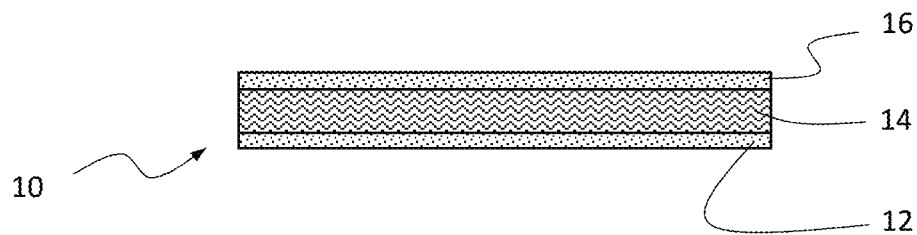

FIG. 3b is a sectional end view of the tape depicted in FIG. 3a.

Figure 3C:
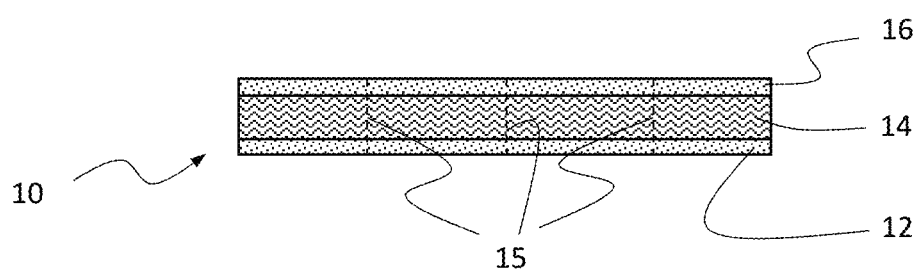

FIG. 3c is a sectional side view of the tape depicted in FIG. 3a.

As illustrated in FIGS. 3a-c, the inventive tape includes a first layer 12 of thermally conductive material; a second layer 16 of thermal insulation; and a third layer 14 of endothermic material, sandwiched between the first and second layers 12 and 16 respectively.

The first layer 12 may be made of porous or non-porous fabric with or without elastic properties, plastic, biodegradable plastic (made of corn starch or other traditional petrochemical), rubber, metal, PTFE or Teflon. The second layer 16 may be plastic, biodegradable plastic (made of corn starch or other traditional petrochemical), rubber, metal, PTFE or Teflon.

The third layer 14 is constructed with reactants effective to cause an endothermic chemical reaction. In an illustrative embodiment, with the modifications taught herein, the device 10 may be implemented in accordance with the teachings of U.S. Pat. No. 6,036,004 issued Mar. 14, 2000 to M. L. Bowen entitled MULTI-COMPARTMENT BAG WITH BREAKABLE WALLS, the teachings of which are hereby incorporated herein by reference.

In another embodiment, the reactants are dry, solid compounds such as ammonium nitrate, calcium ammonium nitrate, potassium chloride, ammonium chloride or urea. In this embodiment, the tape is activated by breaking a barrier (not shown) separating water filled chambers and chambers with one or more of the above-mentioned dry compounds, allowing them to mix initiating an endothermic reaction.

In an alternative embodiment, the endothermic reaction is effectuated with dry compounds using, by way of example:
 the reaction of barium hydroxide octahydrate crystals with dry ammonium chloride;
 the reaction of thionyl chloride (SOCl2) with cobalt (II) sulfate heptahydrate; and/or
 reacting ethanoic acid with sodium carbonate In a specific embodiment, a breakable barrier (not shown) in the third layer 14 separates the reactants so the cooling can be initiated at any point by breaking the barrier. The third layer 14 could include multiple layers saturated or interwoven with reactants. The reactants may be dry solid compounds such as ammonium nitrate, calcium ammonium nitrate, potassium chloride, ammonium chloride or urea.

The tape is adapted for activation by breaking a barrier separating water filled chambers and chambers with one or more of the dry compounds, allowing them to mix to initiate the endothermic reaction. The reactants could be implemented with barium hydroxide octahydrate crystals and dry ammonium chloride or thionyl chloride (SOCl2) and cobalt (II) sulfate heptahydrate or ethanoic acid and sodium carbonate.

The third layer 14 could be implemented as a powder or crystal or implemented as a liquid in which case the third layer has sealed borders.

As illustrated in FIG. 3a, the third layer can be implemented with segmented lengths of endothermic reactants to allow for the tape to be cut at various lengths without cutting through a layer of reactants. The segments are separated by cutting or tearing along the seams 15 depicted in FIG. 3a.

Figure 4A:
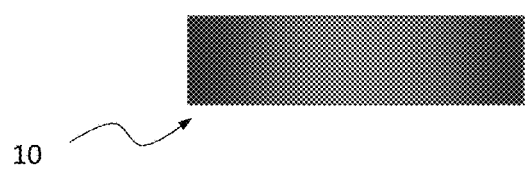
FIG. 4a is an elevated side view of an illustrative embodiment of the tape of the present invention implemented as an elastic ring.

The tape may be implemented as a ring or strip with various fasteners as illustrated in FIGS. 4a-d. FIG. 4a, for example, is an elevated side view of an illustrative embodiment of the tape of the present invention implemented with elastic layers to provide an elastic ring.

Figure 4B:
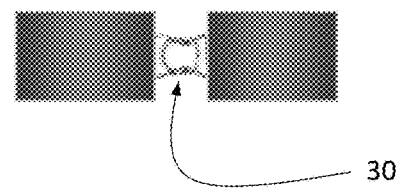
FIG. 4b is an elevated side view of an alternative embodiment of the tape of the present invention implemented with a hook type fastener.

FIG. 4b is an elevated side view of an alternative embodiment of the tape of the present invention implemented with a hook type fastener 30.

Figure 4C:
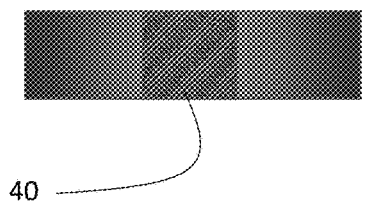
FIG. 4c is an elevated side view of a second alternative embodiment of the tape of the present invention implemented with a hook and loop type fastener.

FIG. 4c is an elevated side view of a second alternative embodiment of the tape of the present invention implemented with a hook and loop (aka Velcro) type fastener 40.

Figure 4D:
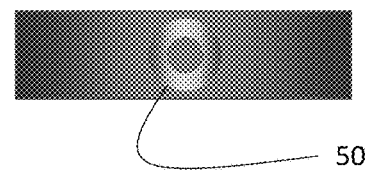
FIG. 4d is an elevated side view of third alternative alternative embodiment of the tape of the present invention implemented with a snap type fastener.

FIG. 4d is an elevated side view of third alternative embodiment of the tape of the present invention implemented with a snap type fastener 50.

All of the above described fasteners may be made of plastic, biodegradable plastic (made of corn starch or other traditional petrochemical), metal or other suited material.

For pipe cooling applications, the tape may be wrapped in a spiral pattern around the pipe and secured in place with adhesive material provided on layers 12 and 16. In this case, the tape 10 is designed for activation upon a tight wrapping of the tape around the pipe. Various embodiments would be made to accommodate pipes of various sizes and to effect activation upon proper application thereto.

Figure 5:
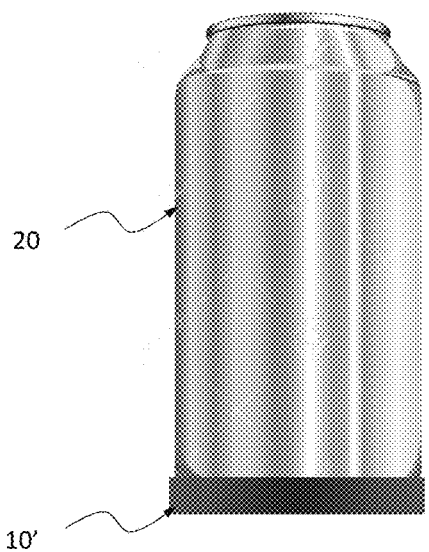
FIG. 5 is perspective view of the cooling pad of the present invention mounted under a beverage container in accordance with an illustrative embodiment of the invention.
Figure 5A:
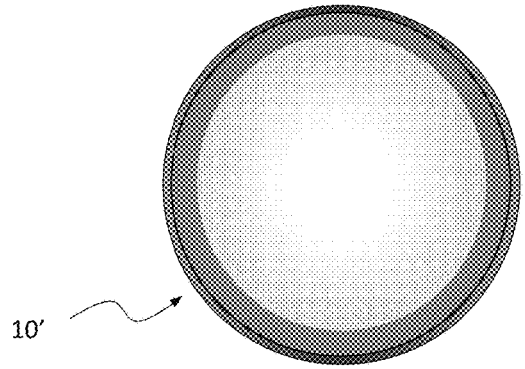
FIG. 5a is a top plan view of the pad depicted in FIG. 4.
Figure 5B:
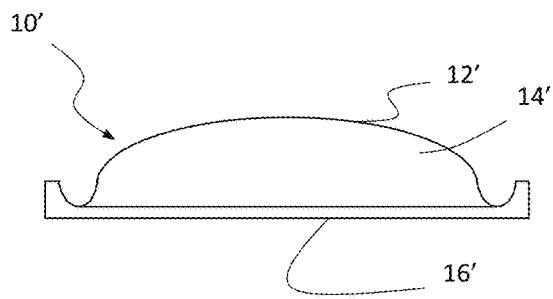
FIG. 5b is a sectional side view of the pad depicted in FIG. 4.

FIG. 5 is perspective view of the cooling pad of the present invention mounted under a beverage container in accordance with an illustrative embodiment of the invention. FIG. 5a is a top plan view of the pad depicted in FIG. 4. FIG. 5b is a sectional side view of the pad depicted in FIG. 4.

As illustrated in FIGS. 5, 5a and 5b, in accordance with the present teachings, a beverage cooling device can be implemented as a cooling pad 10' with a first layer of thermally conductive material 16'; a second layer of material 12'; and a third layer of endothermic material 14', sandwiched between the first and second layers 12' and 16' respectively. Layer 16' may or may not have an adhesive layer to aid in sticking the pad to the bottom of the can.

In the best mode, the first layer 16' is plastic or other suitable thermally conductive material and the second layer 12' is plastic or other suitably rigid material, with or without adhesive properties and made with or without material providing thermal insulation, depending on the attributes desired or required for a given application.

As illustrated in FIGS. 5a and 5b, in the illustrative embodiment, the third layer 14' has a contour effective to create suction whereby the pad 10' adheres to a surface to be cooled. In FIG. 5b, the contour is dome shaped in contemplation of a beverage can 20 with a concave bottom surface.

The inventive tape 10 may be fabricated by applying a strong adhesive such as zinc oxide or other suitable adhesive to layer 16.

Next, the top layer 12, fabricated in the same manner as the bottom layer 16, is applied to the endothermic layer 14. The top and bottom layers 12 and 16 may be 97% tightly woven elasticated cotton with 3% nylon fibers or implemented with a ratio of cotton or nylon better suited for a particular application. The top and bottom layers 12 and 16 may also be constructed without any elastic properties and with or without adhesive properties depending on what it is being applied to. The first layer 12 may be made of porous or non-porous fabric with or without elastic properties, plastic, biodegradable plastic (made of corn starch or other traditional petrochemical), rubber, metal, PTFE or Teflon. The second layer 16 may be plastic, biodegradable plastic (made of corn starch or other traditional petrochemical), rubber, metal, PTFE, or Teflon.

In an alternative embodiment, a hollow section of the tape 10 could be provided and filled with a pre-made, plastic, enclosed tube of reactants. This eliminates the need for the tape to be leak proof. This also simplifies the manufacturing process as the tape can be made with a hollow core and then tubes can be inserted that are either filled with reactants that cool. Those tubes can also be filled with varying quantities depending on the desired intensity of heat or cool.

In an alternative embodiment, the pad 10 could be constructed so when a can or bottle is placed and pressed on top of the dome 16 a barrier is broken from the pressure. This would activate the reaction of cooling the can or bottle.

In an alternative embodiment, multiple cooling pads 10 could be connected within one large pad with six domes to enable the cooling of multiple cans at once. For practical purposes you could set a six pack of cans on top of a pad with six domes. Each pad could be activated by the pressure of each can or a central water chamber barrier could be broken to activate each pad segment via water as a catalyst.

Structure of the Cold Tape:

The tape may be constructed in multiple ways. The tape may be constructed to contain hollow chambers that can hold and separate the individual reactants.

In accordance with the present invention, individual reactants can either be enclosed in a flexible, leak-proof container that will fit into each chamber of the tape or the tape can be constructed of leak-proof material so the raw reactants can be placed directly inside each chamber. In either aspect, there will have to be a breakable barrier that separates the reactants, so the cooling can be initiated at any point by breaking the barrier.

The tape could also be constructed with multiple layers of pre-made reactant strips that are stacked or glued onto each other but separated by a barrier. Squeezing the tape by hand could break the barriers and initiate the endothermic reaction.

Practical Uses and Temperature Ranges:

Non-human use: Tape being adhered to an inanimate object can be made as cold as needed depending on the desired outcome. Practical uses are cooling warm beverages or freezing water to produce ice in remote areas. Another practical use is to freeze a leaking water pipe to temporarily stop a leak. This would enable the pipe to be cut and capped while the damaged pipe section can be repaired or replaced. Again, the reactants can be adjusted to obtain the desired temperature and length of cooling time.

Dimensions of the Cold Tape:

In the best mode, the tape has a width of 1-6 inches, a thickness of 1-40 mm and a length of 3 inches to any length The tape can be manufactured to have segmented lengths of endothermic reactants to allow for the tape to be cut at various lengths without cutting through the container, pouch or layer of reactants.

Those of ordinary skill in the art will appreciate that the present invention is not limited to the fabrics and chemicals disclosed herein. Other combinations of fabrics and chemicals may be employed without departing from the scope of the present teachings. For example, a plurality of small capsules may be provided within the tape which, when squeezed by a user, ruptures and releases a mix of chemicals leading to an endothermic cooling effect.

Those having ordinary skill in the art and access to the present teachings will recognize additional modifications, applications and embodiments within the scope thereof.

It is therefore intended by the appended claims to cover any and all such applications, modifications and embodiments within the scope of the present invention.

The invention claimed is:

1. A device consisting of:
   a first layer of thermally conductive flexible tape;
   a second layer of flexible tape coupled to the first layer to provide at least one hollow chamber therebetween; and
   at least one tube of endothermic reactants, said at least tube of endothermic reactants being self-contained and upon insertion into said at least one hollow chamber, adapts said at least one hollow chamber for independent endothermic effect and
   wherein there is more than one hollow chamber being separated by seams oriented transverse to a longitudinal axis of the tape, to allow for the device to be cut at various lengths without cutting through the endothermic reactants to provide a length suitable for wrapping around a beverage container or pipe, whereby the cooling device, when assembled, is substantially planar prior to application to said beverage container or pipe for secure contact when applied.

* * * * *